United States Patent [19]
Liron et al.

[11] Patent Number: 5,287,066
[45] Date of Patent: Feb. 15, 1994

[54] CROSSTALK REDUCTION CIRCUIT FOR CROSSPOINT MATRIX

[75] Inventors: John E. Liron, Grass Valley; Grant T. McFetridge, Nevada City; Kevin J. Shuholm, Grass Valley, all of Calif.

[73] Assignee: The Grass Valley Group, Nevada City, Calif.

[21] Appl. No.: 883,508

[22] Filed: May 15, 1992

[51] Int. Cl.$^5$ ............................................. H03B 1/00
[52] U.S. Cl. ................................... 328/163; 328/162; 307/520; 379/417
[58] Field of Search ................ 307/520; 328/162, 163, 328/165, 167; 379/292, 416, 417; 340/825.89

[56] References Cited
U.S. PATENT DOCUMENTS

| | | | |
|---|---|---|---|
| 3,711,834 | 1/1973 | Rogers | 340/825.89 |
| 4,053,716 | 10/1977 | Enomoto | 379/417 |
| 4,057,691 | 11/1977 | Goto et al. | 379/417 |

Primary Examiner—William L. Sikes
Assistant Examiner—Toan Tran
Attorney, Agent, or Firm—Francis I. Gray

[57] ABSTRACT

A crosstalk reduction circuit compensates for input to output capacitance coupling of each switch of a crosspoint matrix and for output to common level capacitance coupling for each integrated circuit chip that makes up the crosspoint matrix. Each input signal to the crosspoint matrix is capacitively scaled, summed and inverted to produce an "off" isolation compensation signal, and each output signal from the crosspoint matrix is capacitively scaled, summed and inverted to produce an output isolation compensation signal. Each compensation signal is resistively scaled for each output signal, and the scaled compensation signals are subtracted from the output signals to reduce the crosstalk in the output signals.

7 Claims, 1 Drawing Sheet

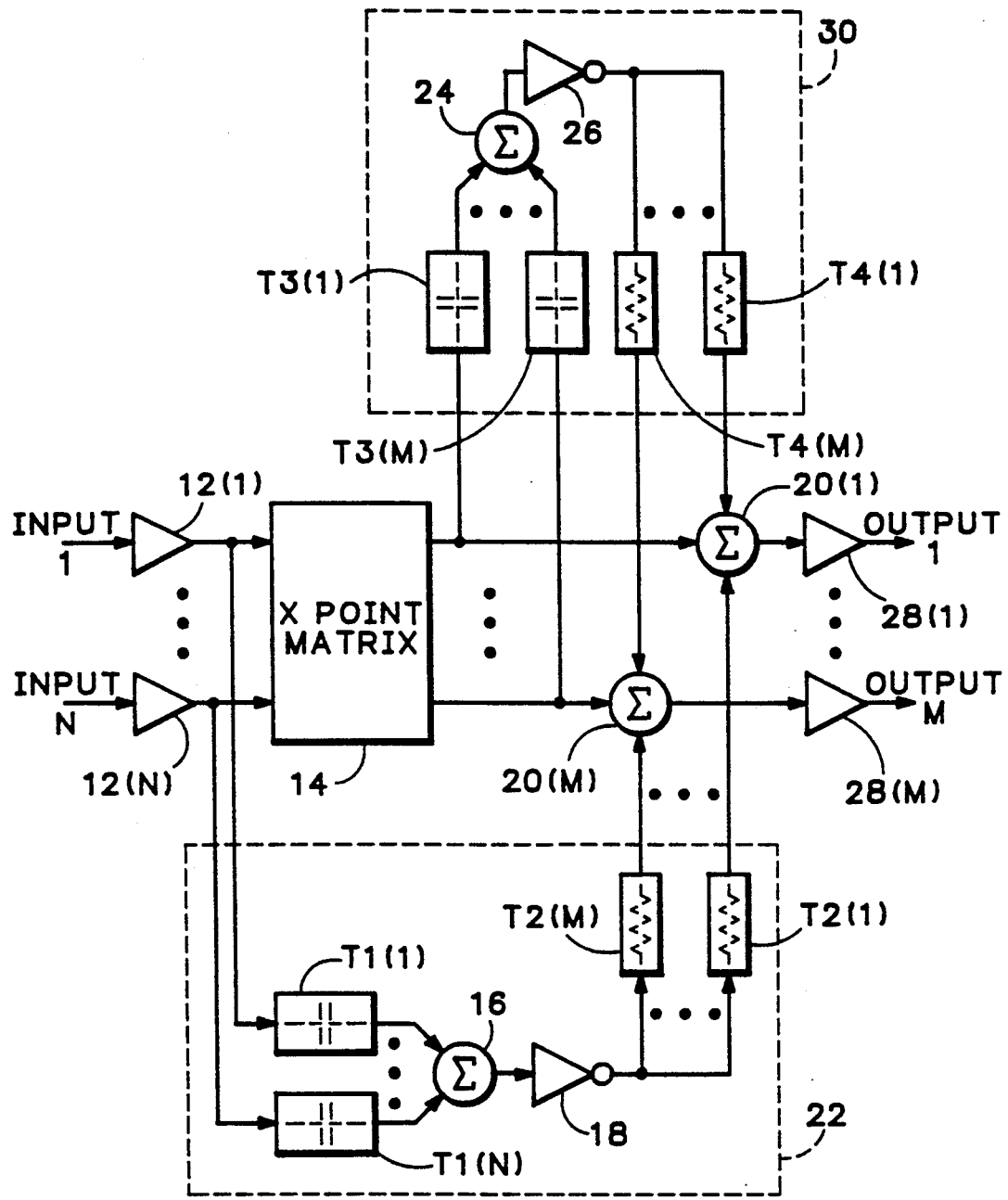

CROSSTALK REDUCTION CIRCUIT FOR CROSSPOINT MATRIX

BACKGROUND OF THE INVENTION

The present invention relates to electronic switches, and more particularly to a crosstalk reduction circuit for reducing the coupling of undesired signals to any given output of the switches.

Electronic equipment has been in use for many years to allow the switching of any chosen input signal, either digital or analog, to one or more output ports. A switching array inside the equipment has a variety of hardware devices, called crosspoints, such as relays, field effect transistors (FETs), digital circuits and the like. However the coupling of undesired signals to any given output port, a phenomenon called "crosstalk", is a persistent problem in all such systems.

The unwanted voltage signals couple through a crosspoint matrix to a given output of the matrix through several mechanisms. Any given switch in the matrix has primarily capacitive coupling from input to output through the switch when the switch is "off". Additionally unwanted coupling capacitance exists between inputs and also between outputs. Finally with integrated circuit crosspoints there is a capacitance between each output port and a common voltage level that also produces unwanted crosstalk. Fortunately for most designs the impedance on the input side is so low that this coupling path between inputs can be neglected. Also the capacitive coupling directly between outputs is negligible compared to the coupling from input to output and between output and the common level.

Currently efforts to reduce crosstalk to acceptable levels have relied upon fabricating crosspoints with better "off" isolation characteristics. Also minimizing unwanted electromagnetic coupling inside the equipment through careful circuit layout is necessary in some applications. However none of these efforts really address the major contributors to the crosstalk problem discussed above.

What is desired is a crosstalk reduction circuit for reducing the coupling of undesired signals to any given output port of a switching array.

SUMMARY OF THE INVENTION

Accordingly the present invention provides a crosstalk reduction circuit that duplicates unwanted hostile signals and then subtracts them from the outputs. A first "off" isolation compensation circuit scales each input signal and sums them together to form an "off" compensation signal. This signal is scaled for each output port and subtracted from the output signal at that output port. A second output isolation compensation circuit also scales each output signal and sums them together to form an output compensation signal. This signal also is scaled for each output port and subtracted from the output signal at that output port. The output signal from the output port represents the input signal switched to that port by the switching array without significant crosstalk.

The objects, advantages and other novel features of the present invention are apparent from the following detailed description when read in light of the appended claims and attached drawing.

BRIEF DESCRIPTION OF THE DRAWING

The Figure is a block diagram view of the crosstalk reduction circuit according to the present invention.

DESCRIPTION OF THE PREFERRED EMBODIMENT

Referring now to the Figure a plurality of input signals INPUT1-INPUTN are input via respective buffer amplifiers 12(1)-12(N) to a crosspoint matrix 14 having N inputs and M outputs. The outputs of the buffer amplifiers are input to respective scaling networks T1(1)-T1(N). The outputs of the scaling networks are input to a summing circuit 16 and inverted by an amplifier circuit 18 to produce an "off" isolation compensation signal. The "off" isolation compensation signal is input to a plurality of scaling networks T2(1)-T2(M), the output of each scaling network being input to respective summing circuits 20(1)-20(M) together with the respective outputs from the crosspoint matrix 14. The two scaling networks T1, T2, the summing circuit 16 and the inverting amplifier circuit 18 form an "off" isolation compensation circuit 22.

The outputs from the crosspoint matrix 14 are input to respective scaling networks T3(1)-T3(M). The outputs of the scaling networks are input to a summing circuit 24, the output of which is inverted by an amplifier circuit 26 to produce an output isolation compensation signal. The output isolation compensation signal is then input to a plurality of scaling networks T4(1)-T4(M) to produce individual compensation signals for input to the respective summing circuits 20(1)-20(M). The outputs from the output summing circuits are the output signals from the crosspoint matrix less the respective scaled compensation signals. These compensated output signals are input to respective output buffers 28(1)-28(M) to produce output signals OUTPUT1-OUTPUTM with reduced crosstalk. The two scaling networks T3, T4, the summing circuit 24 and the inverting amplifier circuit 26 form an output isolation compensation circuit 30.

The first scaling networks T1 may be in the form of capacitors that form a capacitive voltage divider with the coupling capacitance between the input and output of the respective crosspoint. For an integrated circuit the capacitors may all be of equal value. The summing circuit 16 may be in the form of a summing node tied to the inverting input of the amplifier circuit 18. The second scaling networks T2 may be in the form of resistors, with each resistor value being empirically tailored to the particular output of the crosspoint matrix 14 to cancel the unwanted crosstalk. Likewise the third scaling networks T3 may be capacitors and the fourth scaling networks T4 may be resistors. The output summing circuits 20 also may be in the form of summing nodes.

For the situation where the crosspoint matrix 14 is formed from more than one integrated circuit chip, the outputs of each integrated circuit chip are tied via the output scaling networks T3 to individual ones of the inverting amplifier circuits 26, one output inverting amplifier circuit for each integrated circuit chip. The crosstalk at the output is the sum of all of the outputs of each integrated circuit chip, i.e., each output is capacitively coupled to a common level, such as the integrated circuit chip ground plane, so that all outputs are summed at the common level. The resultant combined signal is capacitively coupled back to the outputs. Since the integrated circuit chips are physically separate, there is no crosstalk between the chips so one output inverting amplifier circuit per chip is required.

The crosstalk reduction circuit described above may be implemented as individual components, but preferably would be incorporated on the integrated circuit chip that forms the crosspoint matrix.

Thus the present invention provides a crosstalk reduction circuit that generates an "off" and an output isolation compensation signal from the inputs and outputs, respectively, of a crosspoint matrix, and subtracts a specified amount of the compensation signals from each crosspoint matrix output to reduce crosstalk in the respective output signals from the crosspoint matrix.

What is claimed is:

1. A crosstalk reduction circuit for a crosspoint matrix of the type receiving a plurality of input signals and selectively producing from the input signals a plurality of output signals comprising:
   first means for generating a first compensation signal from the input signals;
   second means for generating a second compensation signal from the output signals; and
   means for combining the first and second compensation signals with the output signals to produce compensated output signals with reduced crosstalk.

2. The crosstalk reduction circuit as recited in claim 1 wherein the first generating means comprises:
   first means for scaling each input signal; and
   first means for summing the scaled input signals to produce the first compensation signal.

3. The crosstalk reduction circuit as recited in claim 2 wherein the first summing means comprises:
   a first summing node to which each scaled input signal is coupled; and
   first means for inverting the sum of the scaled input signals to produce the first compensation signal.

4. The crosstalk reduction circuit as recited in claim 2 wherein the second generating means comprises:
   third means for scaling each output signal; and second means for summing the scaled output signals to produce the second compensation signal.

5. The crosstalk reduction circuit as recited in claim 4 wherein the second summing means comprises:
   a second summing node to which each scaled output signal is coupled; and
   second means for inverting the sum of the scaled output signals to produce the second compensation signal.

6. The crosstalk reduction circuit as recited in claim 4 wherein the combining means comprises:
   second means for scaling the first compensation signal to produce a plurality of first correction signals, one for each output signal;
   fourth means for scaling the second compensation signal to produce a plurality of second correction signals, one for each output signal; and
   means for subtracting the corresponding first and second correction signals from the respective output signals to produce the compensated output signals.

7. The crosstalk reduction circuit as recited in claim 6 wherein the first and third scaling means each comprises a plurality of capacitors, one coupled between each input signal and each input of the first summing means and one coupled between each input of the second summing means and each output signal, and the second and fourth scaling means each comprises a plurality of resistors, one coupled between the output of the first summing means and each output signal and one coupled between the output of the second summing means and each output signal.

* * * * *